United States Patent [19]

Kanamaru et al.

[11] Patent Number: 5,123,935
[45] Date of Patent: Jun. 23, 1992

[54] $AL_2O_3$ COMPOSITES, PROCESS FOR PRODUCING THEM AND THROW-AWAY TIP MADE OF $AL_2O_3$ COMPOSITES

[75] Inventors: Moriyoshi Kanamaru; Tsuneo Tatsuno, both of Kobe; Noboru Ohyama, Kakogawa, all of Japan

[73] Assignee: Kabushiki Kaisha Kobe Seiko Sho, Kobe, Japan

[21] Appl. No.: 582,858

[22] PCT Filed: Feb. 22, 1990

[86] PCT No.: PCT/JP90/00213
§ 371 Date: Dec. 7, 1990
§ 102(e) Date: Dec. 7, 1990

[87] PCT Pub. No.: WO90/09969
PCT Pub. Date: Sep. 7, 1990

[30] Foreign Application Priority Data

Feb. 22, 1989 [JP] Japan ................................. 1-44849
Feb. 25, 1989 [JP] Japan ................................. 1-219919
Aug. 31, 1989 [JP] Japan ................................. 1-226628

[51] Int. Cl.$^5$ ............................................. C04B 35/10
[52] U.S. Cl. .................................... 51/309; 501/89; 501/91; 501/92; 501/95; 501/96
[58] Field of Search ................ 51/309; 501/89, 95, 501/127, 92, 91, 96

[56] References Cited

U.S. PATENT DOCUMENTS

| | | | |
|---|---|---|---|
| 4,320,203 | 3/1982 | Brandt et al. | 51/309 X |
| 4,543,345 | 9/1985 | Wei | 501/89 X |
| 4,745,091 | 5/1988 | Landingham | 501/89 X |
| 4,789,277 | 12/1988 | Rhodes et al. | 501/89 X |
| 4,801,510 | 1/1989 | Mehrotra et al. | 428/698 |
| 4,844,848 | 7/1989 | Clark et al. | 264/43 |
| 4,852,999 | 8/1989 | Mehrotra et al. | 51/309 |
| 4,867,761 | 9/1989 | Brandt et al. | 51/309 |
| 4,889,835 | 12/1989 | Nihara et al. | 501/89 |
| 4,916,092 | 4/1990 | Tiegs et al. | 501/89 |
| 4,956,315 | 9/1990 | Mehrotra et al. | 501/89 X |
| 4,959,332 | 9/1990 | Mehrotra et al. | 501/89 |
| 4,960,735 | 10/1990 | Mehrotra et al. | 501/89 |
| 4,965,231 | 10/1990 | Mehrotra et al. | 501/89 |
| 4,994,416 | 2/1991 | Tiegs et al. | 501/95 X |
| 5,017,524 | 5/1991 | Moskowitz et al. | 501/127 X |
| 5,017,528 | 5/1991 | Tiegs et al. | 501/95 |

FOREIGN PATENT DOCUMENTS 63-111016  5/1988  Japan .

*Primary Examiner*—Karl Group
*Attorney, Agent, or Firm*—Oblon, Spivak, McClelland, Maier & Neustadt

[57] ABSTRACT

In $Al_2O_3$ composites used for machining tools for difficult-cutting steels, etc., strength and toughness are increased by dispersing a Ti compound with an average grain size of not greater than 0.1 $\mu$m into $Al_2O_3$ particles with the average grain size of not greater than 1 $\mu$m, and SiC whiskers are uniformly dispersed between each of $Al_2O_3$ particles to form a nanocomposite structure.

For the above-mentioned purpose, SiC whiskers containing 0.3 to 1.5% by weight of oxygen, dissolved uniformly in a solvent, are mixed with a starting $Al_2O_3$ series powder containing Ti compounds to form a uniform mixture, which is then molded and sintered.

7 Claims, 1 Drawing Sheet

$AL_2O_3$ COMPOSITES, PROCESS FOR PRODUCING THEM AND THROW-AWAY TIP MADE OF $AL_2O_3$ COMPOSITES

TECHNICAL FIELD

The present invention concerns $Al_2O_3$ composites having high strength and toughness, process for producing them and throw-away tips made of $Al_2O_3$ composites.

BACKGROUND ART $Al_2O_3$ composites are excellent in corrosion resistance, oxidation resistance and wear resistance and they have been known, together with $Si_3N_4$ ceramic, etc., as structural materials suitable to machinery parts, jigs, tools, etc., i.e., as engineering ceramics. Although $Al_2O_3$ composites are poor in the strength and fracture toughness, as compared with $Si_3N_4$ ceramic, since they are sinterable at low temperature and highly pure $Al_2O_3$ powder can be available easily at a reduced cost they are outstandingly advantageous in view of the economy or mass production and various studies have been made for improving the foregoing subject in view of the characteristic of $Al_2O_3$ composites.

For instance, U.S. Pat. No. 4,554,445 discloses $Al_2O_3$ composites in which acicular SiC whiskers are dispersed in an $Al_2O_3$ series matrix. The $Al_2O_3$ ceramics in which SiC whiskers are dispersed can be produced by dry-mixing a powder of $Al_2O_3$ with an average grain size of 0.3 μm and SiC whiskers and then sintering them under uniaxial pressing under the condition of 1850° C., 41 MPa for 45 min and it is described that the fracture toughness is improved by about 8 to 9 $kg/mm^{3/2}$ as compared with conventional $Al_2O_3$ composites and the fracture strength can also be improved up to 800 MPa (81.6 $kg/mm^2$).

However, even the $Al_2O_3$ composites having SiC whiskers dispersed therein are still poor in view of the strength and the toughness as compared with $Si_3N_4$ ceramic. Further, in a case where $Al_2O_3$ composites partially contain coarse crystals with the reason as described later, the strength and the toughness are further lowered than those of the conventional $Al_2O_3$ composites, and the relatively high strength or toughness as described above can not easily be reproduced.

That is, coarse crystals are grown in the production process as described above, because the sintering temperature has to be increased owing to the addition of SiC, etc. and, for example, the sintering temperature increases as high as 1850° C. Since SiC whiskers have an effect of suppressing crystal grain growth, no abnormal growth in the crystal grains is caused during sintering if the SiC whiskers are uniformly dispersed. Abnormal growth of the crystal grains occurs in a case where SiC whiskers are localized to result in portions lacking in SiC whiskers.

In view of the above, as a method of suppressing the formation of such coarse crystals, it may be considered a method of at first adding SiC whiskers to a solvent to form a slurry-like mixture (hereinafter simple referred to as a slurry) and then mixing the slurry with an $Al_2O_3$ powder for uniformly dispersing the SiC whiskers. However, it is extremely difficult to uniformly disperse the SiC whiskers in the solvent and uniformly disperse the SiC whiskers in the solvent and uniform dispersion of the SiC whiskers in the slurry requries long time mixing. On the other hand, since the long time mixing breaks the acicular SiC whiskers to remarkably lower the aspect ratio, the SiC whiskers can no more contribute to the improvement of the strength and the toughness in the above-mentioned method, by which no improvement can be expected for the strength and the toughness of the sintering product. In addition, in the method as disclosed in the U.S. patent, the mixture of the $Al_2O_3$ powder and the SiC whiskers are sintered under uniaxial pressing and the molding is applied only by the press-sintering. Accordingly, the density of the ceramics is relatively low in the production method described above and since it is difficult to increase the relative density to greater than 95%, there is also a problem that products of high density and high toughness are difficult to obtain. Further, there is also a problem that it is extremely difficult or substantially impossible to obtain products of large size or complicate shape.

By the way, for the engineering ceramics having high hardness and high strength at high temperature, application uses as throw-away tips (hereinafter simply referred to as tips) used as cutting tools for workpieces of poor machinability have been expected. Spheroidal graphite cast iron or high manganese steel are known as such workpieces of poor machinability, and both of them are materials involving great difficulty in machining because of high strength and poor thermal conductivity in the case of the spheroidal graphite cast iron and because of hardening of the material during cutting in addition to the reason as above in the case of the high manganese steel.

Heretofore, superhard tip of excellent hardness and strength at high temperature have been used for cutting the workpieces of poor machinability. However, even with the method of cutting the workpieces of poor machinability by using such superhard tips (hereinafter referred to as a conventional superhard tipping method), cutting is impossible unless the cutting rate is extremely slow (about less than 30 m/min) thus requiring a long time for machining to greatly worsen the cutting efficiency. In view of the above, $Al_2O_3$—TiC ceramic or $Si_3N_4$ ceramic have been developed and put to practical use in recent years as tips capable of cutting the workpieces of poor machinability at a relatively high speed (about 30 to 60 m/min) instead of the superhard tips has described above.

However, even the $Al_2O_3$—TiC ceramic tips, still involve a problem that they have no sufficient toughness and have low chipping-resistance. Accordingly, in a case where they are applied to the cutting of workpieces of poor machinability such as high manganese cast iron, cutting at an extremely small cutting depth (below 1 mm) is necessary and require a long time for the machining and worsen the cutting efficiency. On the other hand, in the case of cutting the workpieces of poor machinability such as spheroidal graphite cast iron by using tips made of $Si_3N_4$ ceramic, since tips made of $Si_3N_4$ ceramics are readily abraded due to the reaction with cutting powder, there is a drawback that the tip life is extremely short.

As has been described above, the conventional method employed for the machining of the workpieces of poor machinability by using the conventional tip material (hereinafter simply referred to as conventional ceramics tip method) involves the problems that cannot sufficient cutting performance can be obtained.

DISCLOSURE OF INVENTION

The present invention has been made in view of the foregoing situation and a principal object thereof is to overcome the foregoing problems in the conventional $Al_2O_3$ composites and to provide $Al_2O_3$ composites capable of always possessing a texture in which SiC whiskers are uniformly dispersed stably, free from coarse crystals and, accordingly, capable of providing greater strength and toughness stably as compared with conventional $Al_2O_3$ composites, and capable of providing strength and toughness equal with or superior to those of $Si_3N_4$ ceramic.

Another object of the present invention is to provide a process for producing $Al_2O_3$ composites capable of stably producing $Al_2O_3$ composites of high strength and high toughness as described above, as well as capable of producing $Al_2O_3$ composites of large size and/or complicated shape.

A still further object of the present invention is to provide a tip having a high hardness and high strength at high temperature as a tip suitable for the machining of the workpieces of poor machinability, having excellent toughness as compared with conventional ceramic tip and also excellent in the chipping resistance and wear resistance, thereby enabling cutting at high efficiency as compared with the case of machining of the workpieces of poor machinability by conventional tips.

BEST MODE FOR CARRYING OUT THE INVENTION

The $Al_2O_3$ composites according to the present invention contains 10 to 40% by weight of SiC whiskers with the oxygen content of from 0.3 to 0.5% by weight. This is based on the finding that SiC whiskers with the oxygen content of from 0.3 to 0.5% by weight (hereinafter referred to as SiC whiskers according to the present invention) has a nature easily dispersible uniformly in a solvent.

That is, since the SiC whiskers according to the present invention have the foregoing nature, it is possible to easily obtain a slurry in which the SiC whiskers are dispersed extremely uniformly in the solvent. Accordingly, when the slurry is mixed with other various starting powders, a mixture in which the SiC whiskers are homogenously dispersed can be obtained within a short period of time and, accordingly, no coarse crystals are formed when sintering the mixture. In addition, since uniform mixing is conducted in a short period of time as described above, the acicular SiC whiskers are not chipped readily. Accordingly, coarse crystals are eliminated by the effect of the SiC whiskers according to the present invention and $Al_2O_3$ composites in which acicular SiC whiskers are uniformly dispersed can be obtained.

The $Al_2O_3$ composites according to the present invention contain, in addition to the SiC whiskers described above, one or more of Ti compounds represented by the composition formula: $TiC_xN_yO_z$ (in which x, y, z represent, respectively, below: $0 \leq x \leq 1$, $0 \leq y \leq 1$, $0.8 \leq x+y \leq 1$ and $0 \leq z \leq 0.2$) (they may be expressed by the term of "Ti compounds").

In addition, the Ti compound is particles with the size of about several tens of nanometer and show a nanocomposite structure in which the Ti compounds is dispersed in $Al_2O_3$ particles with an average grain size of 1 μm, which has a function of strengthen the matrix and refining the sintered microstructure to provide a high strength. That is, high strength and high toughness as comparable with those of $Si_3N_4$ composites can be obtained in the $Al_2O_3$ composites in accordance with the present invention, because (1) the fibers of the matrix are reinforced by the SiC whiskers uniformly dispersed between each of the $Al_2O_3$ particles and (2) particles of the Ti compound with a size of about several tens of nanometer are deposited in the fine $Al_2O_3$ particles to show a nanocomposite structure, that is, multi-toughening effect.

The oxygen content in the SiC whiskers is defined as from 0.3 to 1.5% by weight, because SiC whiskers are not stably dispersed uniformly in a solvent and, as a result, grain growth of $Al_2O_3$ is formed, failing to obtain high strength and high toughness stably if the oxygen content is less than 0.3% by weight. On the other hand, oxygen (present as $SiO_2$) and $Al_2O_3$ are brought into reaction to reduce the high temperature strength if the content of oxygen exceeds 1.5% by weight.

The SiC whiskers have a function of reinforcing the matrix thereby increasing the strength and the toughness. The content is defined as from 10 to 40% by weight, because such a reinforcing effect is scarcely recognized if it is less than 10% by weight whereas the amount of $Al_2O_3$ is relatively reduced to deteriorate excellent property of $Al_2O_3$ (corrosion resistance, etc.), while SiC reactive with iron is increased relatively to deteriorate the abrasion resistance, as well as SiC whiskers are not dispersed sufficiently uniformly to result in the reduction of the strength if it exceeds 40% by weight.

The content of the Ti compounds is defined as 0.5 to 40% by weight, because the effect of reinforcing the matrix is scarcely recognized if it is less than 0.5% by weight, whereas the amount of $Al_2O_3$ is relatively reduced to deteriorate the excellent performance of $Al_2O_3$ (corrosion resistance, etc.), if it exceeds 40% by weight.

For the Ti compounds, it is desirable to control the amount of oxygen to 1.0–6.0% by weight and C to 16.5 to 19.0% by weight by using one or more of Ti compounds represented by the composition formula $TiC_xN_yO_z$ in which x, y, z represent respectively: $0 \leq x \leq 1$, $0 \leq y \leq 1$, $0.8 \leq x+y \leq 1$, $0 \leq z \leq 0.2$, with an aim of improving the strength and the sinterability.

Referring to the effect described above, if the amount of oxygen is less than 1.0% by weight, the Ti compounds reacts with $Al_2O_3$ during sintering to evolve CO or $CO_2$ gases, and the gases remain to provide pores, which lowers the sinterability and the strength. If the amount of oxygen is not less than 1.0% by weight, since the Ti compounds is coated with $TiO_2$ not reactive with $Al_2O_3$, reaction with $Al_2O_3$ no more occurs. If the amount of oxygen exceeds 6.0% by weight, the amount of the coating $TiO_2$ is increased to result in the grain growth of $Al_2O_3$ and reduce the strength.

If the amount of C is less than 16.5% by weight, the content of the Ti compound is reduced to lower the strength, whereas if it exceeds 19.0% by weight reaction with $Al_2O_3$ tends to occur during sintering to lower the crystallinity.

As the sintering aid, one or more of magnesium oxide, zirconium oxide, titanium oxide, yttrium oxide, chromium oxide, nickel oxide, calcium carbide (hereinafter referred to as MgO, $ZrO_2$, $TiO_2$, $Y_2O_3$, $Cr_2O_3$, NiO and $Cr_3C_2$) is incorporated by from 0.1 to 3% by weight, because sintering is promoted by the sintering aid and the sintered texture is refined and homogenized. The above-mentioned effect is not recognized with the addition amount of less than 0.1% by weight, while the hardness, high temperature strength and thermal shock resistance of the sintering product are reduced if it exceeds 3% by weight.

Further, the average grain size of the $Al_2O_3$ particles in the sintering product is made to less than 1 $\mu m$ so that high strength can surely be obtained. For obtaining crystals with the average crystal grain size of less than 1 $\mu m$, it is desirable to select starting $Al_2O_3$ powder having an average crystal grain size of less than 1 $\mu m$.

In the $Al_2O_3$ composites according to the present invention, it is only necessary that fine particles of the Ti compounds sufficiently exist within the $Al_2O_3$ particles and a portion of the Ti compound may exist at the grain boundary of $Al_2O_3$.

Then, for producing the $Al_2O_3$ composites according to the present invention, the pressure for uniaxial press-molding is set to 500–5000 Kg/cm². If it is less than 500 Kg/cm², since the SiC whiskers are not oriented sufficiently as described above, the relative density of the sintering product is as low as less than 95%, whereas if it exceeds 5000 Kg/cm², the ratio between the density of the sintering product and the pressing energy is reduced to make the energy loss greater.

For obtaining a nanocomposite structure which is a texture characteristic to the $Al_2O_3$ composites according to the present invention, adequate sintering conditions are necessary for the starting ceramic powder and the preferred sintering temperature condition is from 1700° to 1950° C. If the temperature is lower than 1700° C., the relative density of the sintering product is less than 95%, failing to obtain practical strength of products. On the other hand, if it exceeds 1950° C., reduction and carbonization of $Al_2O_3$ occur remarkably to lower the of strength and the Ti compound is not dispersed into the $Al_2O_3$ particles.

When sintering is further applied under hot isostatic pressure at a temperature from 1200° to 1900° C. after pressureless sintering, intense shrinkage occurs preferentially in the pressing direction upon uniaxial press molding, thereby enabling to further increase the density to increase the relative density of greater than 98% and the strength and the toughness can be increased further. The sintering temperature in this case is from 1200° to 1900° C. because the above-mentioned effect can not be obtained at a temperature lower than 1200° C., whereas the ratio of the extent of the effect and the heat energy is reduced to make the energy loss larger if the temperature exceeds 1900° C.

The SiC whiskers, in the $Al_2O_3$ composites of the present invention are in the form of the acicular form and oriented in a 2-dimensional form in parallel with the rake face when they are molded as a throw-away tip. Accordingly, the SiC whiskers are disposed within the rake face such that the axial direction of the acicular SiC whiskers is in parallel with the rake face. When the SiC whiskers are oriented in such a way, since extremely great resistance is provided to the main component of the cutting force upon machining, the chipping-resistance can be made further excellent. It is not necessary that the 2-dimensional orientation for the SiC whiskers as described above is attained entirely but it may be oriented at least within the rake face having a direct effect on the cutting performance such as chipping resistance, that is, near the rake face. Further, referring to the relation of disposing the whiskers to each other in the 2-dimensional orientation, respective whiskers may be disposed in parallel or in perpendicular to each other, radially or at random.

Further, the tip according to the present invention has a shape in which the radius at the corner is from 1.0 to 2.0 min, for ensuring excellent chipping resistance. If the radius at the corner is less than 1.0 mm, the resistance to the main component of the cutting force is lowered to deteriorate the chipping resistance, whereas if it is exceeds 2.0 mm, the cutting resistance is increased to cause defects.

Further, the honing width is made to 0.15–0.30 mm to ensure excellent chipping resistance. That is, if the honing width 0.15 mm, the resistance to the main component of the cutting force is reduced to deteriorate the chipping resistance. If it exceeds 0.30 mm, the cutting resistance is increased to cause defect.

The tip according to the present invention has an excellent chipping resistance and a high speed cutting performance as comparable with or superior to those of the conventional tip comprising $Al_2O_3$ composites as described above. Accordingly, as compared with the case of the conventional ceramic tip, tip defect is not caused even for a large cutting depth and difficult-cutting steels can be cut at a high speed equal to or greater than that in the conventional method. That is, referring quantitatively, difficult-cutting steels can be cut at a cutting rate of greater than 30 m/min at a cutting depth of greater than 1 mm. Therefore, in accordance with the method of the present invention, difficult-cutting steels can be cut at a high efficiency as compared with the conventional sintered carbide method and conventional ceramic tip method. When the cutting depth is expressed as a function of an inscribing circle of the tip, the cutting depth can be made greater than $\frac{1}{4}$ of the inscribing circle of the tip in the method of the present invention, which is greater than that of the conventional ceramic tip method (less than $\frac{1}{4}$ the tip inscribing circle). However, if the cutting depth is made greater than $\frac{1}{2}$ for the tip inscribing circle and the cutting speed is made higher than 80 m/min, the main component of the cutting force exerted on the tip is increased, to some time cause defects at the top end of the tip. Accordingly, it is desirable to control the cutting amount to less than $\frac{1}{2}$ of the tip inscribing circle when the cutting speed is made greater than 80 m/min. Further, if the cutting amount is made greater than $\frac{1}{2}$ of the tip inscribing circle, it is desirable to reduce the cutting rate or cutting speed to less than 80 m/min.

In the method according to the present invention, the feed amount can be made greater than 0.15 mm/rev, which means that cutting is possible at a greater feed amount than in the conventional ceramic tip method (0.15 mm/rev). However, if it exceeds 0.35 mm/rev, flaking may some time be resulted on the rake face of the tip and it is desirable to reduce the feed amount to less than 0.35 mm/rev.

Examples of the present invention will be described below.

EXAMPLE 1

TiC or TiN was added to an $Al_2O_3$ powder and they were stirred and mixed in a wet mill for 20 hours to obtain a mixture.

Meanwhile, SiC whiskers with controlled amount of oxygen was added to a solvent, to which supersonic energy was applied for 30 min to obtain a slurry.

The mixture was added to the slurry and they were stirred and mixed for 20 hours in a wet mill and then dried and granulated by a spray drier. The resultant powder mixture was packed in a graphite die and sintered under uniaxial pressing by a hot press in an Ar gas stream under the conditions: 1850° C., 200 $Kg/cm^2$, 45 min, to obtain $Al_2O_3$ composites containing TiC or TiN and SiC whiskers. These ceramics were $Al_2O_3$ composites having a nanocomposite structure according to the present invention.

In the SiC whiskers, the amount of oxygen, the addition amount of SiC whisker and the addition amount of TiC, TiN were changed. The amounts are shown together with the mechanical properties in Table 1. As shown in Table 1, the oxygen content in the SiC whiskers was changed to three steps of 0.3, 0.5 and 1.5% by weight and the addition amount of the SiC whiskers were changed to three steps of 10, 20 and 30% by weight.

For the $Al_2O_3$ composites thus obtained, flexual strength at a room temperature and at a high temperature (1400° C.) and relative density were measured respectively. The results are also shown in Table 1. As can be seen from Table 1, all of $Al_2O_3$ composites had flexual strength at a room temperature of greater than 97.5 $Kg/mm^2$ which is higher as compared with that of the conventional $Al_2O_3$ ceramics. Further, the flexual strength of most of them was greater than 100 $Kg/mm^2$ thus showing the strength as comparable with or superior to that of the $Si_3N_4$ ceramic.

Further, the flexual strength at a high temperature was greater than 39 $Kg/mm^2$ which is greater as compared with that of the conventional $Al_2O_3$ composites. Further, the high temperature flexual strength for most of them was greater than 45 $Kg/mm^2$ thus showing strength as comparable with or greater than that of $Si_3N_4$ ceramic.

Further, the relative density was greater than 99.7%, which was almost equal to the theoretical density.

COMPARATIVE EXAMPLE 1

$Al_2O_3$ composites containing TiC and SiC whiskers were obtained by the same method as in Example 1 (operation, procedure, condition).

Table 2 shows the addition amount of the TiC and SiC whiskers for the ceramics in Comparative Example 1 together with the mechanical properties. As shown in Table 2, the ceramics in Comparative Example 1 are different from the $Al_2O_3$ composites according to the present invention in view of the addition amount of TiC or SiC whiskers.

The thus obtained $Al_2O_3$ composites were measured in the same manner as in Example 1. The results are shown in Table 2. As can be seen from Table 2, the flexual strength at a room temperature was 40 to 80 $Kg/mm^2$ except for Experiment No. 11, which is extremely lowered as compared with the $Al_2O_3$ composites containing TiC and SiC whiskers in Example 1. Further, the flexual strength at high temperature is from 29 to 36 $Kg/mm^2$, which is extremely lowered as compared with that of $Al_2O_3$ composites in Example 1.

The Experiment No. 11 has a flexual strength at a room temperature of 111.5 $Kg/mm^2$, which is substantially equal with that of $Al_2O_3$ composites in Example 1, but the flexual strength at high temperature is 33.3 $Kg/mm^2$ which is extremely lowered as compared with that of $Al_2O_3$ composites in Example 1, because the amount of oxygen in the SiC whiskers is high (2.0% by weight).

EXAMPLE 2

TiC or TiN with controlled amount of oxygen (average crystal grain size: 0.2 $\mu$m) was added to an $Al_2O_3$ powder (average crystal grain size: 0.2 $\mu$m, except for a portion of them) and they were stirred and mixed in a wet mill for 20 hours to obtain a mixture. For the portion of specimens, sintering aid ($Cr_2O_3$: 0.5 wt %, $TiO_2$: 1.0 wt %) was also added.

Meanwhile, SiC whiskers with controlled amount of oxygen was added to a solvent, to which supersonic energy was applied for 30 min to obtain a slurry.

The mixture was added to the slurry and they were stirred and mixed for 20 hours in a wet mill and then dried and granulated by a spray drier. The resultant powder mixture was subjected to the same method as in Example 1 (operations, procedures, conditions) to obtain $Al_2O_3$ composites. These ceramics were $Al_2O_3$ composites according to the present invention.

In the SiC whiskers, the amount of oxygen, the addition amount of SiC whisker and the addition amount of TiC, TiN were changed.

The thus obtained $Al_2O_3$ composites were measured in the same way as in Example 1. The results are shown in Table 3 and Table 4 together with the amount of oxygen in the whiskers, etc. As can be seen from the tables, all of the $Al_2O_3$ composites have a flexual strength at a room temperature of greater than 107.3 $Kg/mm^2$ which is greater than that of the conventional $Al_2O_3$ composites.

COMPARATIVE EXAMPLE 2

$Al_2O_3$ composites containing TiC and SiC whiskers were obtained by the same method as in Example 2 (operation, procedure, condition).

The thus resultant $Al_2O_3$ composites were measured in the same manner as in Example 1. The results are shown in Tables 5 and 6 together with the addition amount of TiC and SiC whiskers. As seen in these tables, Nos. 26-28 among the ceramics in Comparative Example 2 are different from the $Al_2O_3$ composites according to the present invention in view of the amount of oxygen in the SiC whiskers or the addition amount of SiC whiskers. Nos. 29-31 are $Al_2O_3$ composites according to the present invention but No. 16 corresponding to Example 2 has lower oxygen amount in TiC (No. 29) and greater average crystal grain size (No. 30) as compared with No. 16 according to Example 2.

As can be seen from Tables 5 and 6, Nos. 26-28 have a flexual strength at a room temperature from 41.5 to 80 $Kg/mm^2$, which is lower as compared with that in $Al_2O_3$ composites in Examples 1 and 2.

Nos. 29-30 have a flexual strength at a room temperature of 65 to 91 $Kg/mm^2$ which is remarkably lowered as compared with that of No. 15 in Example 2.

EXAMPLE 3

SiC whiskers with the amount of oxygen being controlled to 0.5% by weight was added to a solvent and uniformly dispersed therein by applying a supersonic power for 30 min. Then, a slurry mixture of $Al_2O_3$, TiC and $Y_2O_3$ and a organic binder were added to the dispersion, stirred and mixed in a wet mill for 20 hours and then dried and granulated by a spray drier to obtain a powder mixture. The composition of the powder is shown as Experiment No. 31 in Table 7 as below: SiC whisker: 20 wt %, TiC: 5 wt %, $Y_2O_3$: 1.0 wt % and the balance of $Al_2O_3$.

The powder mixture was uniaxially pressed under a pressure of 2000 $Kg/cm^2$ and molded into material of 5.0 thickness, 6.2 width, 50 length (mm) (aimed molding size). After degreasing the material, it was sintered in an Ar gas stream at 1850° C. for 2 hours and then further applied with sintering under hot isostatic pressure in an Ar gas atmosphere at 16000° C. under 1500 atm for one hour to obtain a sintered product. The sintered product was ground by a diamond grinding wheel to obtain a specimen of 3 mm thickness, 4 mm width and 50 mm length.

The size for the material and the sintering product after the molding and respective sintering were measured to obtain a shirinkage at each of steps. Further, the sintered product after sintering under isostatic pressure was measured for the relative density by the Archimedes method, and a flexual strength by the 3-point bending method (at 30 mm spun, room temperature). The results are shown in Table 7 (Experiment No. 31).

The relative density is 99.8% which is substantially equal to the theoretical density. The flexual density was 94.5 $Kg/cm^2$, which is extremely greater as compared with that of the conventional $Al_2O_3$ composites and shows a strength as comparable with that of $Si_3N_4$ ceramics, etc.

COMPARATIVE EXAMPLE 3

Composition of the powder mixture of this Comparative Example 3 are shown as Experiment Nos. 32-39 in Table 7. As can be seen from the table, the amount of oxygen in SiC whiskers, and the amount of SiC whisker, TiC and $Y_2O_3$ were changed. Such powder mixtures was obtained in the same method as that in Example 3.

Sintered products and specimens were obtained from the powder mixtures by the same methods as in Example 3 and same measurement was conducted. The results are shown in Table 7 (Experiment Nos. 37-39).

As compared with Example 3 (Experiment No. 31), Experiment Nos. 33, 35, 37 and 39 have extremely low relative density (82.0-94.4%) and extremely low flexual strength at room temperature (30-39 $Kg/mm^2$). Experiment Nos. 32, 36 showed somewhat lower density (99.1-99.2%) and extremely low flexual strength (47.1-49.9 $Kg/mm^2$). Experiment Nos. 34 showed equal density of 99.9% but extremely low flexual strength (42.4 $Kg/mm^2$) since the amount of SiC whisker is small.

COMPARATIVE EXAMPLE 4

Sintering products and test specimens were obtained by the same method as in Example 3 by using the same powder mixture as in Example 3, except for the pressure in uniaxial press molding, temperature for the pressureless sintering and temperature for sintering under hot isostatic pressure and same measurement was conducted. Table 8 shows the molding pressure and the sintering temperature, as well as the results of the measurement (Experiment Nos. 40-44). Table 8 also shows the result for Example 3 (Experiment No. 31) for the comparison.

As compared with Example 3 (No. 31), Experiment Nos. 40-44 in Comparative Example 4 show extremely low relative density (74.5-92.2%) and extremely small flexual strength at a room temperature (18-30 $Kg/mm^2$).

EXAMPLE 4

SiC whiskers with the amount of oxygen being controlled to 0.6% by weight was added to a solvent and uniformly dispersed in the solvent by applying supersonic powder for 30 min to obtain a slurry. An $Al_2O_3$ powder or a mixture of an $Al_2O_3$ powder, a Ti compound and a sintering aid was added to the slurry and they were stirred and mixed in a wet mill for 20 hours and then dried and granulated by a spray drier. The resultant powder mixture was packed in a graphite die and sintered under uniaxial pressing in an Ar gas stream under the condition of: 1850° C., 200 $Kg/cm^2$ by a hot press for 30 min to obtain a sintered product ($Al_2O_3$ composites). Thus, the whiskers in the sintered product could be oriented in a 2-dimensional manner in parallel with the surface of the hot press. The addition amount of the SiC whisker and the Ti compound, the kind and the addition amount of the sintering aid were changed as shown in Table 9. The content of the SiC whiskers was 20 to 30% by weight.

Figure 1:
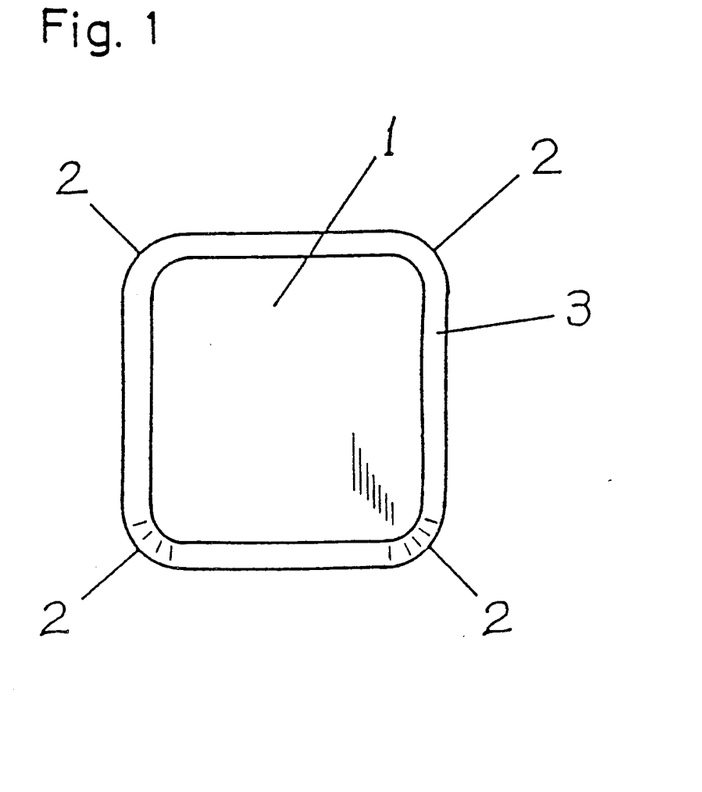
FIG. 1 is a front elevational view illustrating the shape of a throw-away tip made of $Al_2O_3$ composites according to the present invention.
Figure 2:
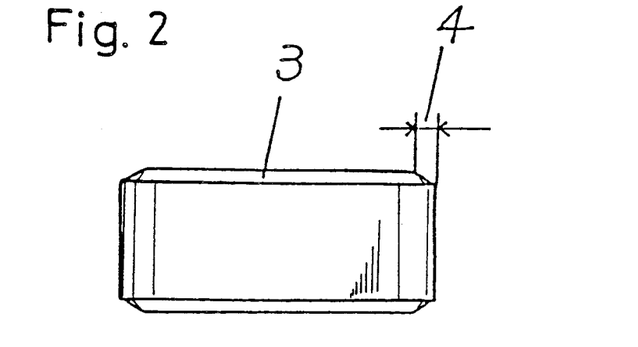
FIG. 2 is a side elevational view illustrating a shape of the throw-away tip.

A tip sized $5.2 \times 13.5 \times 13.5$ mm was cut out from the sintering product such that the rake face of the tip was in perpendicular with the hot pressing axis and it was fabricated into a shape of SNGN 434 T-4 by a tip grinder (ISO standard). FIG. 1 shows the front elevational view and FIG. 2 shows the side elevational view of the tip. In these figures, are shown a rake face (1), a round corner portion (2), a honing portion (3) and a honing width (4). The corner radius at the round corner portion (2) was 1.6 mm and the honing width (4) was 0.2 mm.

The thus obtained tip is an example for the tip according to the present invention and can satisfy all of the conditions for the tip according to the present invention.

The tip was attached to a bite to assemble a tool which was used for the following cutting test. That is, high manganese cast steel was machined at a cutting speed of 60 m/min, cutting depth of 4 mm and feed amount of 0.25 mm/rev, and a time till chipping resulted (hereinafter referred to as chipping time) were measured. Further, spheroidal graphite cast iron (FCD45) was machined at a cutting speed of 300 m/min, cutting depth of 4 mm and feed amount of 0.22 mm/rev, and the chipping time and the abrasion amount were measured. The results for the cutting test are shown in Table 9.

Further, a cutting test was conducted for high manganese steel by using the tip of Experiment 46 shown in Table 9 under the condition of cutting depth of 5 mm, cutting time of 30 min, cutting rate of 60 m/min and feeding amount of greater than 0.25 mm/rev, and the limit values for the cutting rate and feeding amount capable of cutting without causing tip defects were determined.

The limit values for the cutting rate were 70, 50 and 35 m/min relative to the feeding amount of 0.25, 0.35 and 0.5 mm/rev respectively. The limit values for the feeding amount were 0.39, 0.355 and 0.1 mm/rev relative to the cutting rate of 60, 70 and 100 m/min respectively.

COMPARATIVE EXAMPLE 5

A sintered product was obtained in the same method (operation procedures, conditions) as those in Example 4. Table 10 shows the addition amount of the SiC whiskers, the Ti compound and the sintering aid. The amount of oxygen in SiC whiskers was 0.2 and 2.0% by weight for Experiment Nos. 58 and 59 and 0.6% by weight for other experiments as in Example 4.

From the above sintering products, tips of the same size as in Example 4 were cut out by the same method. However, in Experiment No. 62, the tip was cut out such that the rake face of the tip is in parallel to the hot pressing axis, different from the case of Example 4. Further, a tip comprising a sintered product in which the whiskers in the sintered product were oriented at random was also prepared for comparison. Experiment No. 60 corresponds to such a case.

Then, it was fabricated into the same tip shape as that in Example 4 by a tip grinder. However, the corner radius was 0.8 mm and the honing width was 0.1 mm for Experiment No. 60 and the corner radius was 3.0 mm and the honing width was 0.4 mm for Experiment No. 61.

Using the cutting tools assembled by attaching the tips to the bites, two types of the same cutting test as those in Example 4 were conducted. Table 10 shows the result of such cutting test.

As shown in Table 9, cutting tools having tips in Comparative Example 5 are different from the cutting tool according to the present invention, and the chipping time was 0.1 to 15 min in the case of cutting the high manganese cast steels and the chipping time was 5 to 10 min, the abrasion amount was 0.89 to 1.02 in the case of cutting the spheroidal graphite cast iron: FCD45 by using these cutting tools.

As shown in Table 10, the cutting tool having a chip according to Example 4 corresponds to the cutting tool according to the present invention. The chipping time in the case of high manganese steels by using them was 37 to 120 min, which is extremely long as compared with the case of using the cutting tool in Comparative Example 5. Further, the chipping time was 5 to 15 min and the abrasion amount was 0.42 to 0.59 in the case of cutting the spheroidal graphite cast iron: FCD45, which were extremely small as compared with the case of using the cutting tool according to the Comparative Example 5.

These results demonstrate that the cutting tool according to the present invention is excellent in the chipping resistance and the abrasion resistance. Such excellent cutting performance is attributable to that the cutting tool according to the present invention has high hardness and high strength at a high temperature and has excellent toughness as compared with the conventional ceramic cutting tool.

COMPARATIVE EXAMPLE 6

When a cutting test was conducted for high manganese steels by using a superhard tip under the same conditions as those in Example 4, i.e., 60 mm/min of cutting rate, 5 mm of cutting depth and 0.25 mm/rev of feeding amount, remarkable crater abrasion was soon developed making the cutting impossible.

Further, a cutting test was applied to high manganese steel under the conditions: 5 mm of cutting depth, 30 min of cutting time, greater than 10 m/min of cutting rate and greater than 0.25 mm/rev of feed amount, to determine the limit values for the cutting rate and the feed amount. The limit values for the cutting rate were 20 and 15 mm/min relative to the feed amount of 0.2 and 0.35 mm/rev, while the limit values for the feed amount were 0.355 and 0.350 mm/rev relative to the cutting rate of 10 and 15 m/min.

TABLE 1

| Exp. No. | Oxygen amount of SiC whisker (%)* | Addition amount of SiC whisker (%)* | TiC amount (%)* | TiN amount (%)* | $Al_2O_3$ amount (%)* | Relative density (%) | Room temperature flexural strength Kg/mm$^2$ | High temperature flexural strength Kg/mm$^2$ |
|---|---|---|---|---|---|---|---|---|
| 1 | 0.5 | 20 | 4 | — | 76 | 99.7 | 126.2 | 57.3 |
| 2 | 0.5 | 20 | — | 4 | 76 | 99.9 | 117.2 | 51.1 |
| 3 | 0.5 | 20 | 28 | 1.2 | 76 | 99.9 | 121.8 | 50.5 |
| 4 | 0.5 | 30 | 21 | — | 49 | 99.8 | 114.0 | 45.2 |
| 5 | 0.5 | 10 | 4 | — | 86 | 100 | 101.9 | 39.7 |
| 6 | 0.5 | 20 | 4 | — | 76 | 100 | 111.4 | 41.4 |
| 7 | 0.5 | 20 | 4 | — | 76 | 99.7 | 97.5 | 45.9 |
| 8 | 0.3 | 20 | 4 | — | 76 | 98.9 | 117.5 | 50.5 |
| 9 | 1.5 | 20 | 4 | — | 76 | 99.9 | 123.2 | 44.3 |

(note) * ... wt %

TABLE 2

| Exp. No. | Oxygen amount of SiC whisker (%)* | Addition amount of SiC whisker (%)* | TiC amount (%)* | $Al_2O_3$ amount (%)* | Relative density (%) | Room temperature flexural strength Kg/mm$^2$ | High temperature flexural strength Kg/mm$^2$ |
|---|---|---|---|---|---|---|---|
| 10 | 0.1 | 20 | 4 | 76 | 95.0 | 67.7 | 31.9 |
| 11 | 2.0 | 20 | 4 | 76 | 100.0 | 111.5 | 33.3 |
| 12 | 0.5 | 5 | 20 | 75 | 99.9 | 80.1 | 30.5 |
| 13 | 0.5 | 50 | 4 | 46 | 92.9 | 45.7 | 29.4 |
| 14 | 0.5 | 20 | 0.3 | 79.7 | 100.0 | 78.9 | 35.5 |
| 15 | 0.5 | 20 | 45 | 35.0 | 88.1 | 42.2 | 20.8 |

(note) * ... wt %

TABLE 3

| Exp. No. | SiC whisker Oxygen amount (%) | SiC whisker Addition amount % | TiC powder Grain size μm | TiC powder Oxygen amount (%) | TiC powder Addition amount % | TiN powder Grain size μm | TiN powder Oxygen amount (%) | TiN powder Addition amount % |
|---|---|---|---|---|---|---|---|---|
| 16 | 0.5 | 20 | 0.2 | 2.1 | 4 | — | — | — |
| 17 | 0.5 | 20 | — | — | — | 0.2 | 1.9 | 4 |
| 18 | 0.5 | 20 | 0.2 | 2.1 | 2.8 | 0.2 | 1.9 | 4 |
| 19 | 0.5 | 30 | 0.2 | 2.1 | 21 | — | — | — |
| 20 | 0.5 | 10 | 0.2 | 2.1 | 4 | — | — | — |
| 21 | 0.3 | 20 | 0.2 | 2.1 | 4 | — | — | — |
| 22 | 0.5 | 30 | 0.2 | 2.1 | 4 | — | — | — |
| 23 | 0.5 | 20 | 0.2 | 2.1 | 4 | — | — | — |
| 24 | 0.5 | 20 | 0.2 | 2.1 | 4 | — | — | — |
| 25 | 0.5 | 20 | 0.2 | 5.5 | 4 | — | — | — |

(note) % means wt %

TABLE 4

| Exp. No. | $Al_2O_3$ powder Grain size μm | $Al_2O_3$ powder Addition amount (%)* | Average crystal grain size of sintering product μm | Sintering aid: value in ( ) is addition amount (%)* | Relative density (%) | Room temperature flexual strength Kg/mm² |
|---|---|---|---|---|---|---|
| 16 | 0.1 | 76 | 0.5 | — | 100 | 139.3 |
| 17 | 0.1 | 76 | 0.5 | — | 100 | 128.9 |
| 18 | 0.1 | 76 | 0.5 | — | 99.9 | 134.0 |
| 19 | 0.1 | 49 | 0.5 | — | 100 | 125.4 |
| 20 | 0.1 | 86 | 0.5 | — | 100 | 112.1 |
| 21 | 0.1 | 76 | 0.5 | — | 99.9 | 122.5 |
| 22 | 0.1 | 66 | 0.5 | — | 99.8 | 107.3 |
| 23 | 0.1 | 76 | 0.5 | $Cr_2O_3$ (0.5) $TiO_2$ (1.0) | 99.9 | 140.7 |
| 24 | 0.25 | 76 | 0.9 | — | 100 | 126.2 |
| 25 | 0.1 | 76 | 0.5 | — | 100 | 124.6 |

(note) * ... wt %

TABLE 5

| Exp. No. | SiC whisker Oxygen amount (%) | SiC whisker Addition amount % | TiC powder Grain size μm | TiC powder Oxygen amount (%) | TiC powder Addition amount % | TiN powder |
|---|---|---|---|---|---|---|
| 26 | 0.1 | 20 | 0.2 | 2.1 | 4 | — |
| 27 | 0.5 | 5 | 0.2 | 2.1 | 20 | — |
| 28 | 0.5 | 50 | 0.2 | 2.1 | 4 | — |
| 29 | 0.5 | 20 | 0.2 | 0.9 | 4 | — |
| 30 | 0.5 | 20 | 0.2 | 16.4 | 4 | — |
| 31 | 0.5 | 20 | 0.2 | 2.1 | 4 | — |

(note) % means wt %

TABLE 6

| Exp. No. | $Al_2O_3$ powder Grain size μm | $Al_2O_3$ powder Addition amount (%)* | Average crystal grain size of sintering product μm | Sintering aid: value in ( ) is addition amount (%)* | Relative density (%) | Room temperature flexual strength Kg/mm² |
|---|---|---|---|---|---|---|
| 26 | 0.1 | 76 | 0.5 | — | 94.8 | 51.9 |
| 27 | 0.1 | 75 | 0.5 | — | 100 | 80.1 |
| 28 | 0.1 | 46 | 0.5 | — | 90.2 | 41.5 |
| 29 | 0.1 | 76 | 0.5 | — | 93.3 | 65.2 |
| 30 | 1.0 | 76 | 2.0 | — | 99.9 | 91.7 |

(note) * ... wt %

TABLE 7

| Exp. No. | Oxygen amount of SiC whisker (%)* | Addition amount of SiC whisker (%)* | TiC amount (%)* | $Al_2O_3$ amount (%)* | Relative density (%) | Room temperature flexual strength Kg/mm² |
|---|---|---|---|---|---|---|
| 31 | 0.5 | 20 | 5 | balance | 99.8 | 94.5 |
| 32 | 2.0 | 20 | 5 | balance | 99.1 | 47.1 |
| 33 | 0.1 | 20 | 5 | balance | 94.4 | 37.5 |
| 34 | 0.5 | 5 | 20 | balance | 99.9 | 42.2 |
| 35 | 0.5 | 50 | 4 | balance | 85.7 | 31.2 |
| 36 | 0.5 | 20 | 0.1 | balance | 99.2 | 49.9 |
| 37 | 0.5 | 20 | 50 | balance | 91.0 | 39.4 |
| 38 | 0.5 | 20 | 5 | balance | 82.9 | 30.5 |
| 39 | 0.5 | 20 | 5 | balance | 92.1 | 35.8 |

(note) * ... wt %

TABLE 8

| Exp. No. | Pressure in uniaxial press molding Kg/cm² | Temperature for atmospheric pressure sintering °C. | Temperature for HIP sintering °C. | Relative density (%) | Room temperature flexual strength Kg/mm² |
| --- | --- | --- | --- | --- | --- |
| 31 | 2000 | 1850 | 1600 | 99.8 | 94.5 |
| 40 | 200 | 1850 | 1600 | 81.1 | 30.1 |
| 41 | 2000 | 1600 | 1600 | 74.5 | 14.7 |
| 42 | 2000 | 2000 | 1600 | 92.2 | 27.6 |
| 43 | 2000 | 1850 | 2000 | 91.7 | 18.6 |
| 44 | 2000** | 1850 | 1600 | 74.5 | 25.5 |

(note) ** ... HIP molding

TABLE 9

| Exp. No. | Al₂O₃ amount (wt %) | Addition amount of SiC whisker (wt %) | Addition amount of TiC, etc. (wt %) | Kind and addition amount of sintering aid (wt %) | Chipping time upon cutting high manganese steel (min) | Cutting for spheroidal graphite cast iron | |
| --- | --- | --- | --- | --- | --- | --- | --- |
| | | | | | | Chipping time (min) | Abrasion amount (mm) |
| 45 | 50 | 30 | TiC:20 | — | 71 | >30 | 0.55 |
| 46 | 75 | 20 | TiC:5 | — | >120 | >30 | 0.41 |
| 47 | 50 | 30 | TiC:20 | Y₂O₃:1.0 MgO:0.5 | 80 | >30 | 0.59 |
| 48 | 75 | 20 | TiC:5 | Y₂O₃:0.5 ZrO₂:1.0 | >120 | >30 | 0.42 |
| 49 | 75 | 20 | TiN:5 | — | 93 | >30 | 0.55 |
| 50 | 50 | 30 | TiC:15 TiN:5 | — | 82 | >30 | 0.52 |

*Cutting test for high manganese steel was conducted to max. 120 min.
Cutting test for spheroidal graphite cast iron was conducted to max. 30 min.

TABLE 10

| Exp. No. | Al₂O₃ amount (wt %) | Addition amount of SiC whisker (wt %) | Addition amount of TiC, etc. (wt %) | Kind and addition amount of sintering aid (wt %) | Chipping time upon cutting high manganese steel (min) | Cutting for spheroidal graphite cast iron | |
| --- | --- | --- | --- | --- | --- | --- | --- |
| | | | | | | Chipping time (min) | Abrasion amount (mm) |
| 51 | 70 | 30 | — | — | 37 | >30 | 0.57 |
| 52 | 70 | 30 | — | Y₂O₃:1.0 | 35 | >30 | 0.62 |
| 53 | 95 | 5 | — | — | 0.5 | 10 | — |
| 54 | 70 | 5 | TiC:25 | — | 2 | 15 | — |
| 55 | 50 | 50 | — | — | 1.5 | 5 | — |
| 56 | 30 | 20 | TiC:50 | — | 0.1 | 5 | — |
| 57 | 70 | 30 | — | Y₂O₃:5.0 | 10 | >30 | 0.89 |
| 58 | 50 | 30 | TiC:20 | — | 5 | 10 | — |
| 59 | 50 | 30 | TiC:20 | — | 9 | >30 | 1.02 |
| 60 | 70 | 30 | — | — | 15 | 15 | — |
| 61 | 70 | 30 | — | — | 1 | 5 | — |
| 62 | 70 | 30 | — | — | 0.1 | 5 | — |
| 63 | 70 | 30 | — | — | 0.2 | 5 | — |

The foregoing results demonstrate that high Mn steels can be cut without causing tip defects, with a greater cutting depth and at a higher cutting speed as comparable with or superior to the conventional ceramics tip method by the method according to the present invention, that is, high Mn steels can be machined at a high efficiency as compared with the conventional superhard tip method and conventional ceramic tip method.

INDUSTRIAL APPLICABILITY

Since the Al₂O₃ composites according to the present invention have excellent features as described above, they are suitable to jigs and tools such as cutting tools or dice extraction and extension plugs requiring toughness and abrasion resistance, electronic parts such as ceramic heaters requiring electroconductivity and thermal shock resistance, as well as machinery parts such as mechanical shields or pumps requiring corrosion resistance, oxidation resistance, abrasion resistance and fracture toughness.

In particular, they are most suitable as throw-away tips used for the machining of difficult-cutting material such as high manganese steel or spheroidal graphite cast iron and it is possible to cut such workpieces of poor machinability at a high speed and with a high cutting depth.

We claim:

1. High strength and high toughness Al₂O₃ composites sintered product comprising:
   10 to 40% by weight of SiC whiskers containing 0.3 to 1.5% by weight of oxygen,
   0.5 to 40% by weight of one or more of Ti compounds represented by the composition formula: $TiC_xN_yO_z$ in which x, y, z represent, respectively; $0 \leq x \leq 1$, $0 \leq y \leq 1$, $0.8 \leq x+y \leq 1$, $0.8 \leq x+y \leq 1$, $0 \leq z \leq 0.2$ and
   0.5 to 3% by weight of a sintering aid,
   remainder Al₂O₃,
   wherein
   the average grain size of Al₂O₃ particles in the sintered product is not greater than 1 μm, and one or more of said Ti compounds with the average grain size of not greater than 0.1 μm are dispersed in said Al₂O₃ particles to form a nanocomposite structure.

2. Al$_2$O$_3$ composites as defined in claim 1, wherein the sintering aid is at least one element selected from the group consisting of magnesium oxide, zirconium oxide, titanium oxide, yttrium oxide, chromium oxide, nickel oxide and chromium carbide.

3. A method of producing Al$_2$O$_3$ composites sintered product having high strength and high toughness comprising:

10 to 40% by weight of SiC whiskers containing 0.3 to 1.5% by weight of oxygen, 0.5 to 40% by weight of one or more of Ti compounds represented by the composition formula: TiC$_x$N$_y$O$_z$ in which x, y, z represent, respectively; $0 \leq x \leq 1$, $0 \leq y 1$, $0.8 \leq x+y \leq 1$, $0.8 \leq x+y \leq 1$, $0 \leq z \leq 0.2$ and 0.5 to 3% by weight of a sintering aid, remainder Al$_2$O$_3$, wherein the average grain size of Al$_2$O$_3$ particles in the sintered product is not greater than 1 μm, and one or more of said Ti compounds with the average grain size of not greater than 0.1 μm are dispersed in said Al$_2$O$_3$ particles to form a nanocomposite structure, which comprises mixing the SiC whiskers uniformly dispersed in a solvent, with the other defined materials, removing said solvent to form a uniform mixture, subjecting said mixture to uniaxial press molding under a pressure of from 500 to 5000 Kg/cm$^2$ and, further, applying sintering at an atmospheric pressure within a temperature range from 1700° to 1950° C.

4. A production process for Al$_2$O$_3$ composites as defined in claim 3, wherein sintering under hot isostatic pressure is further applied at a temperature from 1200° to 1900° C. after the sintering under the atmospheric pressure.

5. A throw-away tip having a rake face comprising Al$_2$O$_3$ composites as defined in claim 1, wherein the SiC whiskers are oriented in parallel with the rake face of a tip and said tip has from 1.0 to 2.0 mm of corner radius and from 0.15 to 0.30 mm of honing width.

6. A method of machining difficult-cutting steels at a high efficiency comprising machining the difficult-cutting steels with the throw-away tip as defined in claim 5.

7. The method as defined in claim 6, wherein the difficult-cutting steels are high manganese steel or spheroidal graphite steels.

* * * * *

UNITED STATES PATENT AND TRADEMARK OFFICE
CERTIFICATE OF CORRECTION

PATENT NO. : 5,123,935

DATED : June 23, 1992

INVENTOR(S) : Moriyoshi Kanamaru et al.

It is certified that error appears in the above-identified patent and that said Letters Patent is hereby corrected as shown below:

On the title page:

The Foreign Application Priority Data is incorrect, should be,

--Feb. 22, 1989  [JP]  Japan........................1-44849

Aug. 25, 1989  [JP]  Japan........................1-219919

Aug. 31, 1989  [JP]  Japan........................1-226628--.

Signed and Sealed this

Thirty-first Day of August, 1993

*Attest:*

BRUCE LEHMAN

*Attesting Officer*     *Commissioner of Patents and Trademarks*